(No Model.) 3 Sheets—Sheet 3.
O. P. BRIGGS.
WIRE COILING MACHINE.
No. 544,344. Patented Aug. 13, 1895.
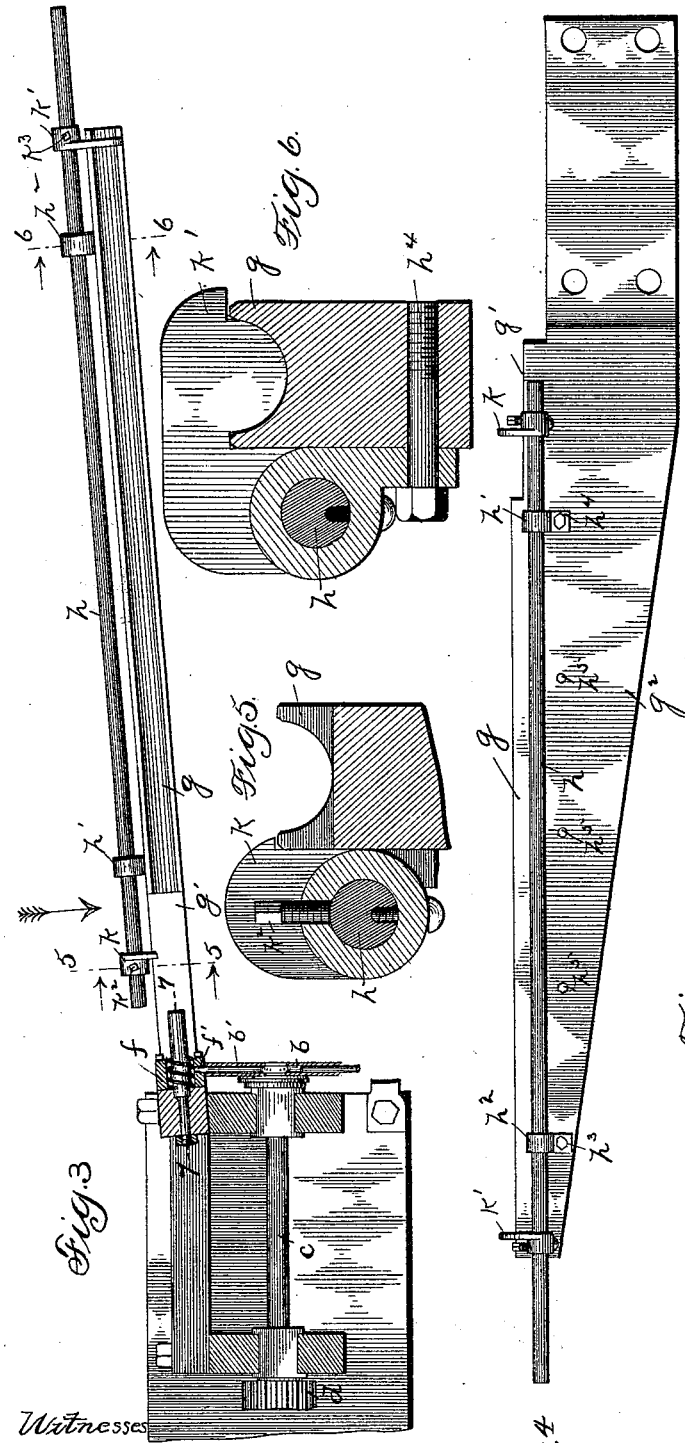
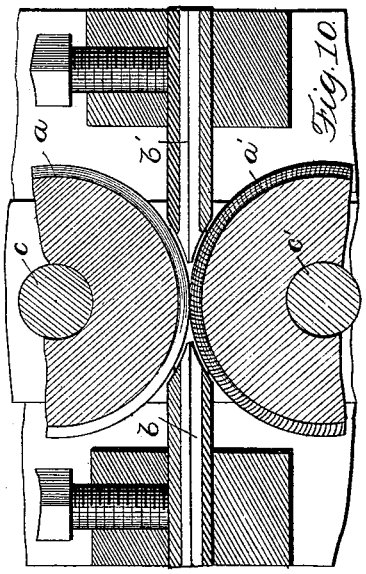
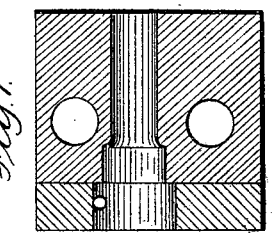
Witnesses
George L. Cragg
W. Clyde Jones
Inventor
Orlando P. Briggs
By Barton & Brown
Attorneys.

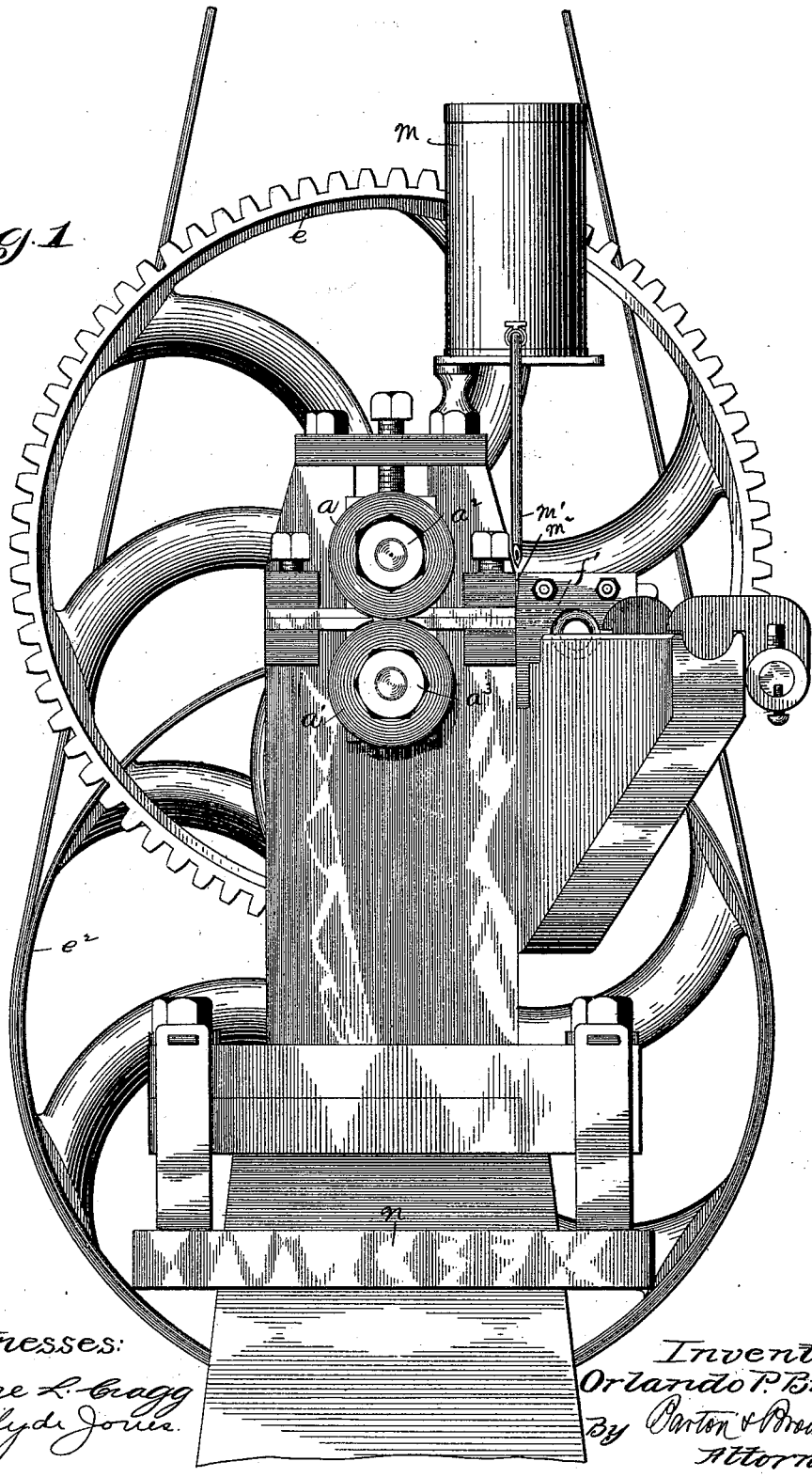

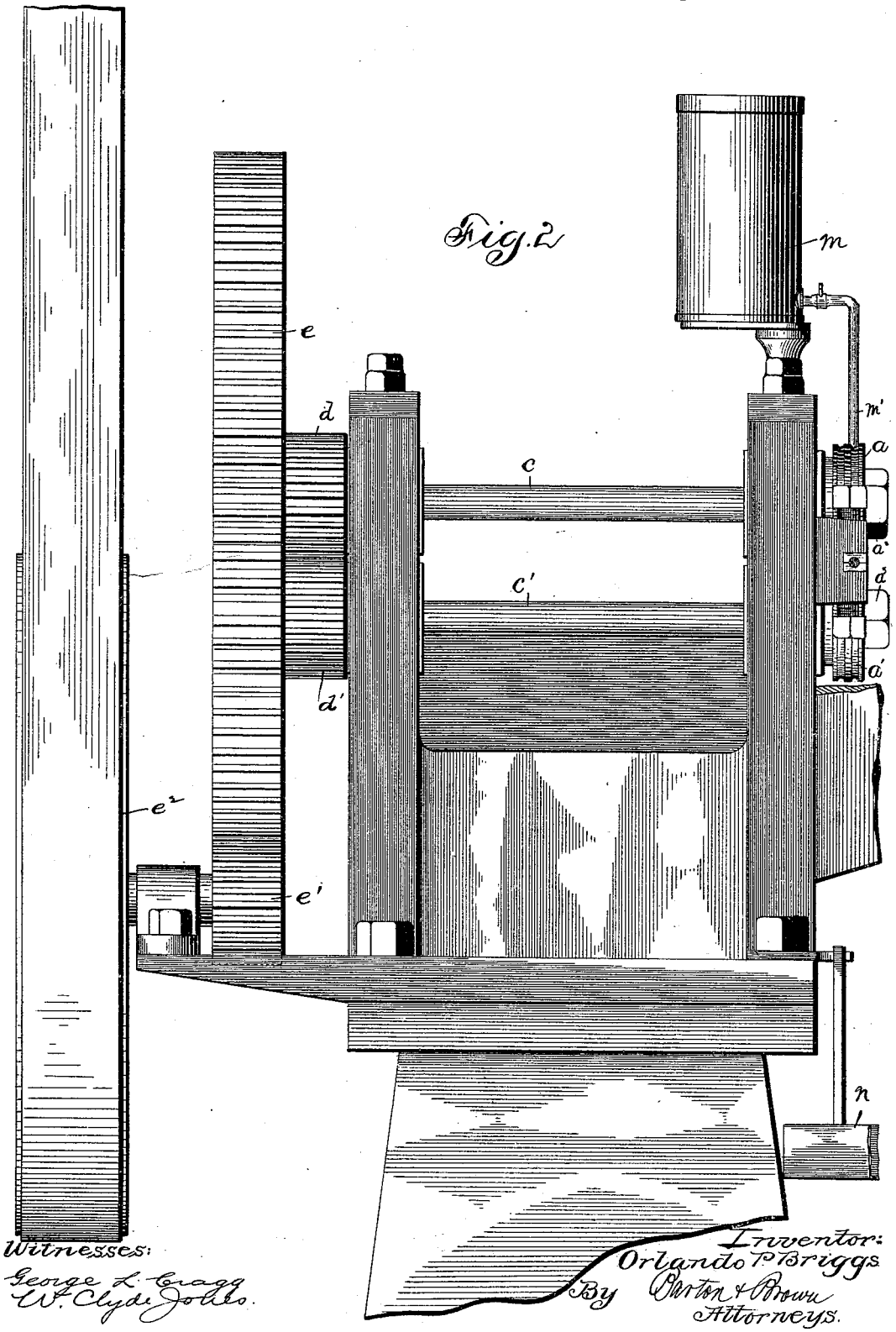

UNITED STATES PATENT OFFICE.

ORLANDO P. BRIGGS, OF CHICAGO, ILLINOIS, ASSIGNOR TO THE WESTERN ELECTRIC COMPANY, OF SAME PLACE.

WIRE-COILING MACHINE.

SPECIFICATION forming part of Letters Patent No. 544,344, dated August 13, 1895.

Application filed January 20, 1894. Serial No. 497,548. (No model.)

*To all whom it may concern:*

Be it known that I, ORLANDO P. BRIGGS, a citizen of the United States, residing at Chicago, in the county of Cook and State of Illinois, have invented a certain new and useful Improvement in Machines for Coiling Wire, of which the following is a full, clear, concise, and exact description, reference being had to the accompanying drawings, forming a part of this specification.

My invention relates to a machine for coiling wire, and its object is to provide a machine that shall be simple of construction, and that shall effect the coiling of the wire without injury thereto and at minimum cost.

My invention, generally speaking, comprises a passage-way through which the wire is fed by means of feeding devices acting upon the wire before it reaches said passage-way, a helical form being imparted to the wire during its passage through said way, which is retained upon issuing therefrom to constitute the finished product.

In the preferred embodiment of my invention I provide a pair of positively-driven rollers, between which the wire is passed to impart thereto the feeding movement. In order to prevent the abrasion of that surface of the wire which is to form the outer surface of the completed coil, the roller which engages with said surface is provided with a smooth face, while the face of the roller that engages with the surface of the wire which is to form the interior of the coil is knurled or milled to secure the necessary engagement of the wire to effect the feed. The passage-way through which the wire is passed comprises a cylindrical bore, within which is concentrically located a mandrel, a space being left between the mandrel and the walls of the bore approximately equal to the diameter of the wire to be operated upon. The wire in passing through the way thus produced is coiled into a helical form, which form it maintains upon passing from the mandrel. When it is desired to coil the wire with the adjacent turns of the completed coil in contact, the mandrel may be made cylindrical, an annular space being thus provided, which causes the wire fed into the same to assume a helical shape with the turns abutting. When it is desired to coil the wire with the adjacent turns not abutting, the mandrel may be provided with a helical groove, the pitch of which is determined by the desired pitch of the completed coil. The wire fed through this helical groove assumes the desired coiled form. The coiled wire upon issuing from the mandrel passes upon a guideway provided with a gaging apparatus, by means of which the operator may determine when a sufficient length of coiled wire has been produced, the machine being then stopped and the desired length of coil severed, after which the machine is started and the operation repeated.

The machine embodying the above-mentioned features will be best understood by reference to the accompanying drawings, in which—

Figure 1 is an elevational end view of the machine. Fig. 2 is an elevational side view thereof. Fig. 3 is a top view, partially in section, of a portion of the machine, illustrating the feeding mechanism, mandrel-block, and gaging apparatus. Fig. 4 is a side view of the bracket or arm carrying the guideway, upon which the completed coil is fed and to which is attached the gaging apparatus. Fig. 5 is a sectional view upon line 5 5, Fig. 3. Fig. 6 is a sectional view upon line 6 6, Fig. 3. Fig. 7 is a sectional view of the mandrel-block on line 7 7, Fig. 3. Fig. 8 is a view of a mandrel provided with a helical groove. Fig. 9 is a view of a mandrel provided with a cylindrical surface. Fig. 10 is a detached view, partially in section, of the feeding mechanism.

Like letters refer to like parts in the several figures.

A pair of rollers $a$ $a'$ is provided, between the opposed peripheries of which the wire is adapted to be passed through the guiding-channels $b$ $b'$. The roller $a$ is mounted upon the shaft $c$, while roller $a'$ is mounted upon the shaft $c'$, the shafts being driven in opposite directions through the agency of the engaging pinions $d$ $d'$, the pinion $d$ being mounted upon the shaft $c$ with the gear-wheel $e$, which meshes with the pinion $e'$, driven by the pulley $e^2$. The periphery of the roller $a$, which engages with that surface of the wire which is to form the exterior of the completed coil, is made smooth, while the periphery of the roller $a'$, which engages with that surface of the wire which is to form the interior of the coil, is knurled or milled to secure the necessary grip upon the wire. The rollers are held in position by nuts $a^2$ $a^3$, screwed upon the ends of the shafts $c$ and $c'$, respectively, so that the rollers may be removed by unscrewing said nuts. Each roller is preferably provided with two peripheral grooves of different sizes, so that the same pair of rollers will accommodate two sizes of wire by reversing each roller upon its shaft.

The wire passes through the guiding-channel $b$, is engaged by the rollers, and advanced through channel $b'$. Channel $b'$ communicates with a channel $f'$ in the mandrel-block $f$, which channel $f'$ opens into the space provided between the mandrel and the walls of the mandrel-block. As shown more clearly in Fig. 3, the axis of the mandrel is placed at an angle with the axis of rotation of the feeding-rollers, the angle being determined by the pitch of the groove in the mandrel, or, when the smooth mandrel is used, by the pitch of the wire coiled, so that the turns of the helix abut.

As shown in Fig. 1, the channel $f'$ is so situated that the wire on passing into the coiling passage-way between the mandrel and the mandrel-block is bent downward in following the periphery of the mandrel. The channel $f'$ may be located so that the wire may be bent upward; but in this case the roller with the knurled periphery should be placed above the smooth roller. The wire having passed around the mandrel and assumed the helical form, it is fed onto the guideway $g$, that portion of the guideway lying next the mandrel-block being flattened into an anvil surface $g'$, upon which the wire may be laid and severed by a cold-chisel or other cutting-tool.

In order to determine the proper length of wire a gaging device is provided in connection with the guideway $g$, comprising a rod $h$, adapted to slide longitudinally in brackets $h'$ $h^2$, which may be secured to the arm or bracket $g^2$, carrying the guideway, by means of pins or bolts $h^3$ $h^4$, passing through holes $h^5$ provided in said bracket $g^2$. Upon said rod $h$ are provided two adjustable distance-pieces $k$ $k'$, which may be secured to the rod at any point by means of screws $k^2$ $k^3$. The distance-pieces are placed one upon each end of the rod $h$ and so located relatively to the supporting-brackets $h'$ $h^2$ that a longitudinal movement of said rod $h$ may be permitted. The distance-piece $k'$ is adapted to lie in the path of the end of the coiled wire as it passes along the guideway $g$, so that when a sufficient amount of wire has been coiled the machine may be stopped and the coil may be severed at the point indicated by the distance-piece $k$. An oil-tank $m$ is placed above the machine and provided with an oil-duct $m'$, which is so situated that oil dripping therefrom may pass by the channel $m^2$, provided between the mandrel-block and the guiding-channel $b'$, to the wire, whereby the wire may be kept lubricated to prevent abrasion of its surface in passing through the coiling passage-way, and, further, to prevent the cutting of the mandrel-block. A drip-pan $n$ is provided beneath the coiling passage-way to catch the oil.

I will now describe briefly the operation of the machine as above described.

The wire is fed between the rollers $a$ $a'$, which advance the same through the channel $f'$ into the helical groove formed in the mandrel. The groove guides the wire and the wire is bent by coming in contact with the walls of the mandrel-block. The coil upon issuing from the mandrel passes along the guideway $g$, and when of sufficient length the machine is stopped, the distance-piece $k'$ is brought against the end of the coil, and the coil is severed at the point indicated by the distance-piece $k$. Should the machine be stopped before the end of the coil reaches the distance-piece $k'$, the rod $h$ may be moved to bring said distance-piece in contact with the end. Should the machine not be stopped until shortly after the end of the coil comes against said distance-piece, the rod $h$ will move longitudinally to accommodate itself to the advanced position of the coil.

When the smooth mandrel is employed the wire, after passing through the channel $f'$, comes in contact with the walls of the mandrel-block and is bent about the mandrel, and the wire being fed at an angle the turn advances along the mandrel and is impelled forward by succeeding turns.

I am aware that it has been proposed heretofore to pass the wire through a helical passage-way to bend the same into a coil; but I believe it to be new to place the channel $f'$ at an angle to the axis of the mandrel determined by the pitch of the coil, the abrupt and undesirable bending of the wire in passing to the helical passage-way being thus avoided.

It is evident that my invention is susceptible of many embodiments without departing from the spirit thereof, and I do not, therefore, desire to limit myself to precise details.

Having described my invention, what I claim as new, and desire to secure by Letters Patent, is—

1. The combination with a passageway adapted to impart to the wire a helical form in passing therethrough, of a pair of feeding rollers between which the wire is passed and thereby fed through said passageway, the periphery of the roller engaging with the surface of the wire which is to form the interior of the coil being knurled or otherwise roughened to readily grasp the wire, the periphery of the roller engaging the surface of the wire which is to form the exterior of the coil being smooth, whereby the exterior surface of the coil is maintained uninjured, substantially as described.

2. In a wire coiling machine, the combination with the guide way along which the coiled wire is fed, of the longitudinally movable gaging rod, the distance piece upon the outer end of said rod adapted to be engaged by the end of the coiled wire, and the distance piece upon the inner end of said rod adapted to indicate the point where the coil is to be severed, substantially as described.

3. In a wire coiling machine, the combination with the guideway along which the coiled wire is fed, of the anvil surface $g'$ provided thereon, the longitudinally movable gaging rod $h$, the distance piece $k'$ upon the outer end of said rod adapted to be engaged by the end of the coiled wire, and the distance piece $k$ upon the inner end of said rod situated opposite said anvil surface $g'$ and adapted to indicate the point where the coil is to be severed, substantially as described.

4. In a wire coiling machine, the combination with the mandrel block $f$ provided with a bore adapted to receive the mandrel, of the rollers $a$ $a'$ adapted to feed the wire through the passage between said mandrel and mandrel block, guide way $g$ comprised in part by the anvil surface $g'$, and the gaging apparatus, comprising the longitudinally movable rod $h$, brackets $h'$ $h^2$, and distance pieces $k$ $k'$, substantially as described.

In witness whereof I hereunto subscribe my name this 26th day of December, A. D. 1893.

ORLANDO P. BRIGGS.

Witnesses:
W. CLYDE JONES,
HARRIET G. TEMPLETON.